Patented Nov. 25, 1947

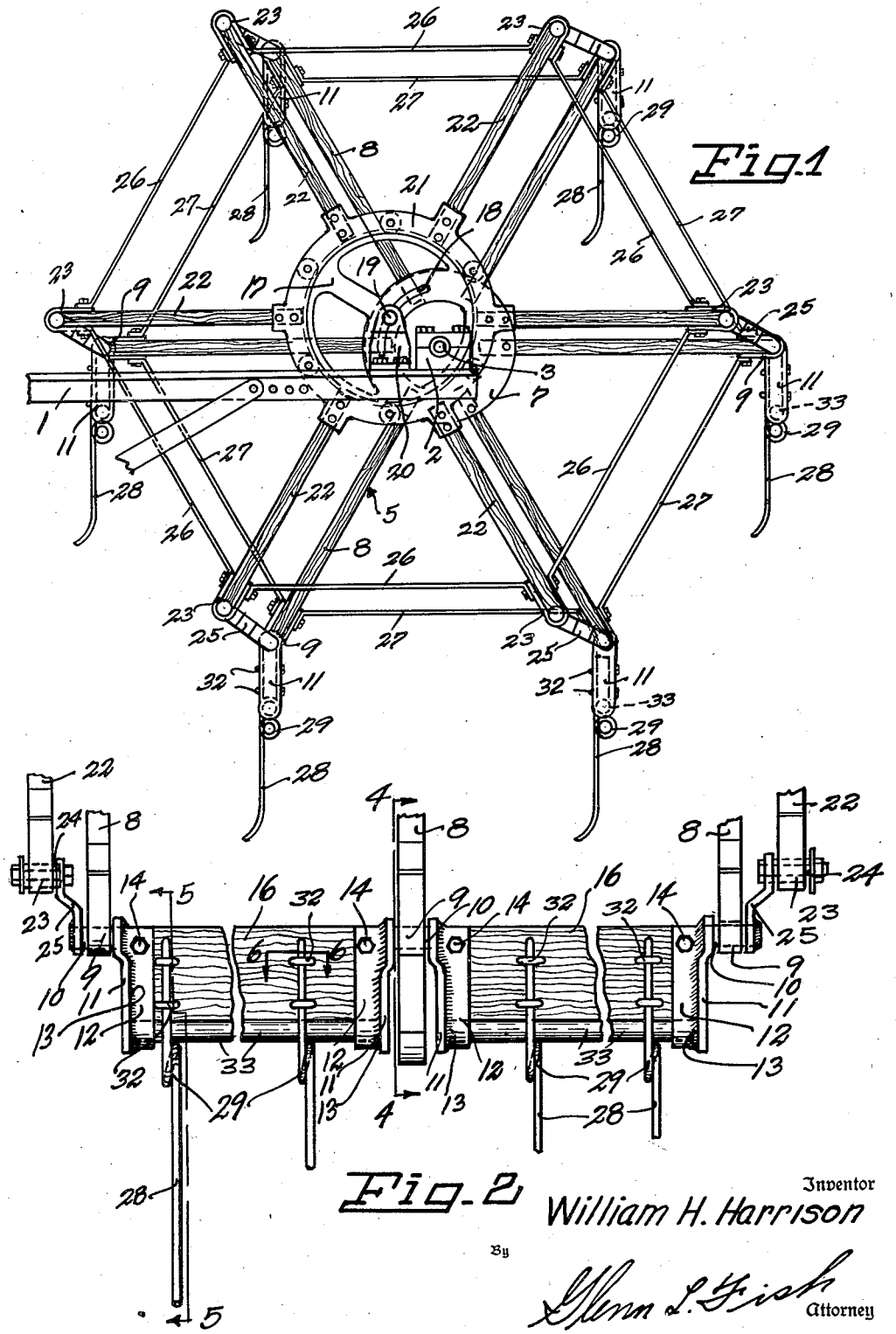

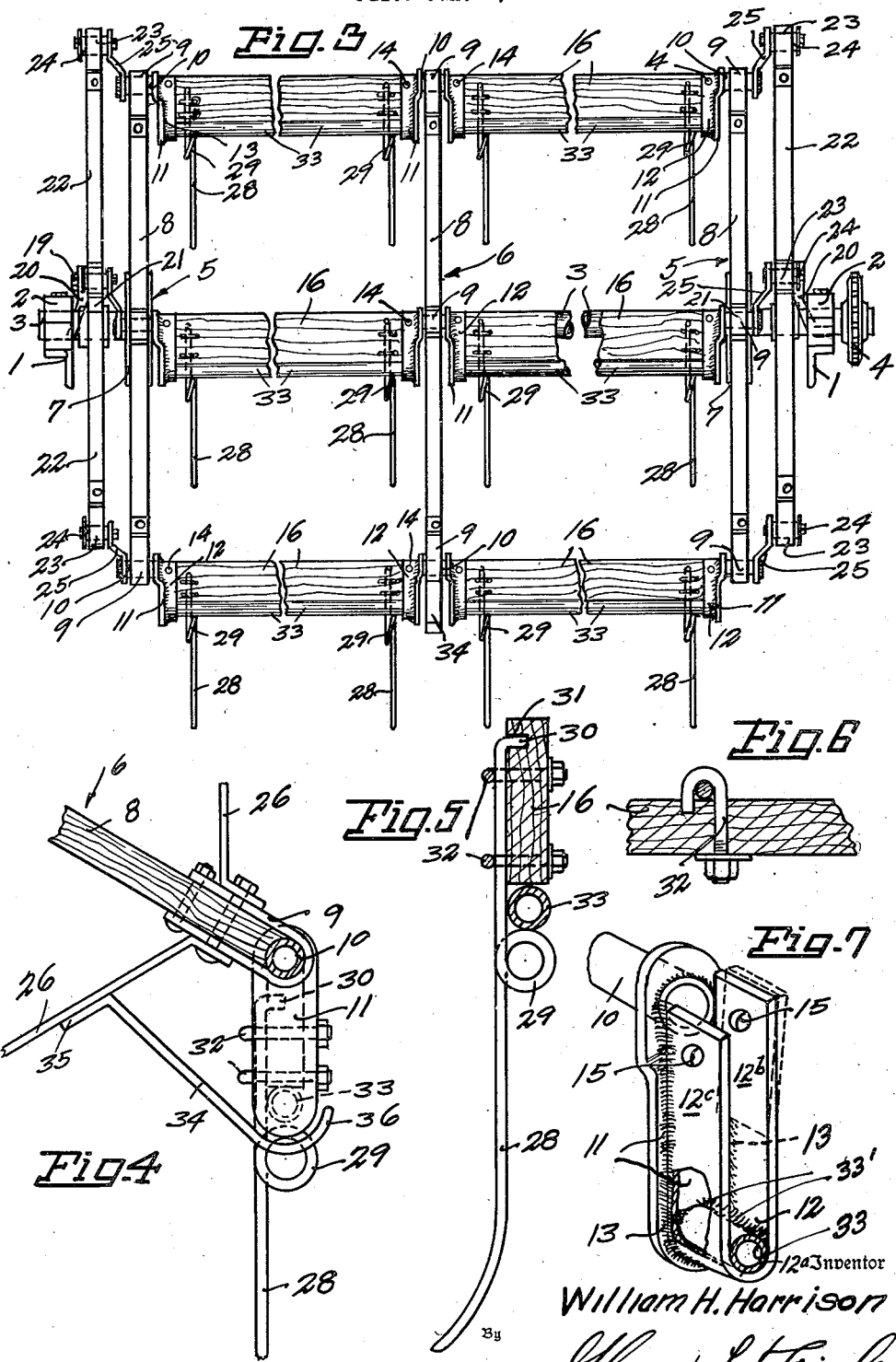

2,431,397

UNITED STATES PATENT OFFICE 2,431,397

HARVESTER REEL

William H. Harrison, Champaign, Ill.

Application June 5, 1944, Serial No. 538,743

2 Claims. (Cl. 56—226)

This invention relates to a harvester reel of the type covered by my prior Patent 2,380,173 issued July 10, 1945, and one object of the invention is to provide a reel with improved bats so mounted that they will remain in a depending vertical position as the reel turns.

Another object of the invention is to provide a reel wherein its bats are carried by hangers pivoted to heads of the reel, the hangers having sockets along their sides formed from metal strips which are U-shaped and have upper portions of their arms free from the hangers so that free upper portions of the strips or walls of the sockets, may be drawn into tight gripping engagement with the bats by bolts and firmly hold the bats in place.

Another object of the invention is to provide the bats with reinforcing bars along their lower edges which have their ends mounted in sockets of the hangers and serve very effectively to prevent lower edge portions of the bats from being worn or cracked during use of a harvester.

Another object of the invention is to provide the bats with tines which are mounted vertically thereon and have portions depending from the bars formed with springs which impart added resiliency to the tines and bear against lower surfaces of the bars so that the springs will not form worn places in lower edges of the bats.

Another object of the invention is to so form and so mount the tines that fingers at their upper ends will be embedded in the bats and prevent the tines from moving transversely out of vertical position at right angles to the bats.

In the accompanying drawings:

Fig. 1 is a side view of the improved reel.

Fig. 2 is a view upon an enlarged scale showing a fragment of the reel in elevation.

Fig. 3 is a view showing the entire reel in elevation.

Fig. 4 is a sectional view upon an enlarged scale taken along the line 4—4 of Fig. 2.

Fig. 5 is a sectional view upon an enlarged scale taken along the line 5—5 of Fig. 2.

Fig. 6 is a fragmentary sectional view upon an enlarged scale taken along the line 6—6 of Fig. 2.

Fig. 7 is a view upon an enlarged scale of one of the hangers in perspective.

The improved reel constituting the subject matter of this invention is of the type used upon harvesters for moving standing grain into contact with a cutter and is rotatably mounted between bars 1 forming part of the frame of the reaper or harvester. These bars 1 carry bearings 2 through which the main shaft 3 of the reel is rotatably mounted and, at one end, the shaft carries a sprocket 4 by means of which rotary motion is transmitted to the shaft.

Heads, indicated in general by the numeral 5, are carried by end portions of the shaft and, for a long reel, there may also be provided a center head or spider 6 midway the length of the shaft. A center head is shown in Fig. 3 but for a short reel this will be omitted. Each head 5, and the spider 6 has a hub 7 secured to the shaft and spokes 8 which extend radially from the hub. These spokes carry bearings 9 at their outer ends through which rocker shafts 10 are rotatably mounted, the rocker shafts constituting pivot members for hangers 11. The rocker shafts of the end heads each carries a single hanger but the rocker shafts of the center head or spider each carries two hangers, one at each end with the spokes of this spider disposed between the hangers.

The hangers are of duplicate construction and each carries a U-shaped strap forming a socket 12 which is open at its upper end and along its inner side, as shown in Fig. 7. Each socket is formed from a strip of resilient metal which is bent to the U-shape and, when it is disposed against the companion hanger, it is welded thereto, as shown at 13. Referring to Fig. 7, it will be seen that while the bridge portion 12a forming the lower end of the socket is welded to the hanger and one arm or wall 12b is welded to the hanger for the entire depth thereof, the other arm or wall 12c of the socket is free from the hanger for a major portion of its length from its upper end when a bolt 14 which passes through openings 15 is tightened the free wall 12c will be drawn towards the rigidly mounted wall 12b and have gripping engagement with an end portion of a bat which fits into the socket. The bats 16 extend longitudinally of the reel between outer ends of spokes of the heads and, since the hangers carrying the bats are pivotally mounted, the bats may assume a position in which they depend vertically from the rocker shafts, as shown in Figs. 1 and 3.

It is desired to insure correct positioning of the bats and cause them to at all times assume the depending vertically disposed position. Therefore, there may have been provided cam disks 17 which are located near opposite ends thereof. Each disk 17 has been shown formed as a spider and has its hub portion formed with an eccentrically located opening through which the shaft 3 passes. The hub is also formed with an arcuate slot 18 to receive a bolt 19 carried by a bracket 20, the brackets 20 being mounted upon the bars 1 of the harvester frame. By so mounting the cams 17, they may be turned about the shaft 3 to adjusted positions and firmly secured in adjusted position. A ring or collar 21 fits snugly about the periphery of each cam disk for rotary motion circumferentially thereof and carries spokes 22 which extend radially therefrom and, at their outer ends, carry bearings 23 through which rotatably pass pintles 24 of cranks 25 which are rigidly carried by the rocker shafts of the hangers at the ends of the reel. Since the cam disks are held stationary in eccentric relation to the shaft 3, rocking motion will be imparted to the rocker shafts as the reel turns and the bats will be continuously maintained in vertical depending relation to the rocker shafts and all of the bats will enter growing grain in a vertical path and then sweep horizontally toward the cutter of the harvester and move upwardly in a vertical path after the grain has been cut. Bracing rods 26 and 27 extend between the spokes 8 of the heads and spokes 22 of the cam actuated members to brace the spokes and hold them in position radially of the hubs 7 and rings 21.

Each bat carries a plurality of tines 28 which are spaced from each other longitudinally thereof, the number of tines provided depending upon the length of the reel and corresponding length of the bats. Each tine is formed from a strand of resilient wire which is bent intermediate its length to form a coiled spring 29 extending laterally from the tine. Upper ends of the strands are bent to form fingers 30 which penetrate the bats or are fitted into sockets 31 formed in side faces thereof, and, in order to hold the tines firmly against side faces of the bats, clamping bolts 32 are passed through the bats with their hooked ends engaged about the tines, as shown in Fig. 6. Referring to this figure, it will be seen that when nuts of the bolts are tightened, the hooked ends will grip the tines and clamp them tightly against the bats. Since upper ends of the tines are embedded in the bats, the tines will be prevented from slipping longitudinally in case the nuts of the bolts should accidentally work loose and, in addition, the tines will be firmly braced against transverse play.

It is desired to prevent lower edges of the bats from being worn and caused to crack when a harvester equipped with a reel of the improved construction is in use. In order to do so, there have been provided tubular bars 33 which extend along lower edges of the bats and have their ends fitting and welded as shown at 33' in Figure 7 into lower ends of the sockets 12 where they are firmly held with the bats resting upon the bars when the bolts 14 are tightened. The springs 29 bear against under surfaces of the bars 33, as shown in Fig. 5, and when the tines are flexed by contact with thick grass or obstructions in a field, wear caused by movement of the springs will be against the bars instead of against lower edges of the bats and the bats will not be weakened and caused to crack or break easily.

In order to prevent grain from catching between adjacent ends of the bats of long reels, there have been provided guards 34. These guards or shields are carried by the braces 26 of the center spider 6 and each is formed from a strip of metal having one end portion bent to form a foot 35 welded to the brace and its other end portion bent to form a bill 36 which curves in conformity to the lower ends of the hangers 11. Since the bills 36 extend between the hangers carrying inner ends of the bats, space between the hangers will be guarded by the shields and grain prevented from catching against ends of the spokes of the center head or spider and becoming wrapped about the rocker shafts carried thereby.

Having thus described the invention, what is claimed is:

1. A harvester reel including heads, horizontal rocker shafts rotatably carried by said heads, hangers carried by said rocker shafts and extending downwardly therefrom, sockets carried by said hangers and each consisting of a U-shaped strap of resilient metal disposed vertically with side edges of its bridge and arms secured against the outer side face of the companion hanger, one arm being free from the hanger for the major portion of its length from its upper end, bats extending between said heads with end portions fitted into the sockets, bolts passed through upper portions of the arms of said sockets and drawing the free arms into gripping engagement with the bats, and means for rotating the rocker shafts during rotation of the reel and maintaining the hangers and their sockets in depending relation to the rocker shafts.

2. A harvester reel including heads, hangers pivoted to said heads and spaced from each other circumferentially of the heads, the hangers being disposed in depending relation to their points of pivotal connection with the heads, sockets extending vertically along said hangers, bars extending between said hangers and having ends mounted in lower end portions of said sockets, bats extending between said hangers with lower edges resting upon said bars and end portions mounted in the sockets, and tines disposed vertically and formed of strands of resilient wire having upper portions secured to the bats and portions below the bats coiled to form springs imparting resiliency to the tines and extending across under portions of the bars in gripping engagement therewith.

WILLIAM H. HARRISON.

REFERENCES CITED

The following references are of record in the file of this patent:

UNITED STATES PATENTS

| Number | Name | Date |
|---|---|---|
| 1,996,294 | Hume et al. | Apr. 2, 1935 |
| 2,115,385 | Edgington | Apr. 26, 1938 |
| 2,165,381 | Hume et al. | July 11, 1939 |
| 2,252,180 | Hume | Aug. 12, 1941 |
| 2,380,173 | Harrison | July 10, 1945 |